United States Patent [19]

Gallagher

[11] 4,272,807
[45] Jun. 9, 1981

[54] REGENERATIVE DC POWER SUPPLY

[75] Inventor: Gerard A. Gallagher, Pittsburgh, Pa.

[73] Assignee: Contraves Goerz Corporation, Pittsburgh, Pa.

[21] Appl. No.: 59,400

[22] Filed: Jul. 20, 1979

[51] Int. Cl.³ ............................................. H02M 7/06
[52] U.S. Cl. ...................................... 363/126; 363/34; 363/89
[58] Field of Search ........................ 363/34, 37, 87–89, 363/126–127, 132

[56] References Cited

U.S. PATENT DOCUMENTS

| 3,679,959 | 7/1972 | Beesley et al. | 363/127 |
| 3,793,578 | 2/1974 | Rettig | 363/132 |
| 3,940,682 | 2/1976 | Park et al. | 363/127 |
| 4,189,764 | 2/1980 | Snyder | 363/37 X |

*Primary Examiner*—William M. Shoop
*Assistant Examiner*—Peter S. Wong

*Attorney, Agent, or Firm*—Robert D. Yeager; Andrew J. Cornelius

[57] ABSTRACT

A DC power supply is disclosed which returns excessive regenerative energy to the AC line. The regenerative power supply generates a DC bus voltage from an AC power line and regulates the maximum DC bus voltage by returning to the AC power line energy supplied through the DC bus from the load. A conventional full wave rectifier bridge is used to rectify the incoming AC power line voltage into a DC bus voltage. A capacitor is connected across the DC bus to dampen high frequency transient voltages which may be present on the DC bus voltage. In anti-parallel with each of the rectifying diode circuits is a power transistor which is controllable to allow current conduction in a direction opposite to its associated rectifying diode. Control circuitry, associated with each of the anti-parallel transistors, senses excessive DC bus voltage and initiates conduction of the transistor when the AC power line phases are at the correct potential for receiving the regenerative energy.

8 Claims, 4 Drawing Figures

REGENERATIVE DC POWER SUPPLY

BACKGROUND OF THE INVENTION

1. Field of the Invention

This invention relates to DC power supplies and more particularly to a DC power supply which is capable of returning excessive regenerative energy from a load to an incoming AC supply line.

2. Description of the Prior Art

Prior art DC power supplies which are capable of returning energy to the AC line utilize relatively complex and expensive circuitry. The control circuit required for these power supplies is also rather complex and expensive. These prior art power supplies normally operate by controlling the firing angle of thyristor output devices. Voltage and current feedback loops are required with all their associated circuitry.

SUMMARY OF THE INVENTION

This invention teaches a relatively simple DC power supply operable from an AC line which returns excessive energy from the load to the AC line. The disclosed regenerative DC power supply generates a DC bus voltage from an AC power line and regulates the maximum amplitude of the DC bus voltage by returning to the AC power supply lines energy supplied from the load. The DC power supply utilizes a conventional full wave rectifying diode bridge to rectify the incoming AC power line voltage into a DC bus voltage. A capacitor is utilized across the DC bus to dampen high frequency transient voltages which may be present on the DC bus. Connected and in anti-parallel with each of the rectifying diodes is a power transistor which is operable to allow current conduction in a direction opposite to its associated rectifying diode. Control circuitry is provided with each transistor which senses excessive DC bus voltage and initiates conduction when the AC power phases are at the correct potential for receiving the regenerative energy.

BRIEF DESCRIPTION OF THE DRAWINGS

For a better understanding of the invention, reference may be made to the preferred embodiment exemplary thereof shown in the drawings wherein.

DESCRIPTION OF THE PREFERRED EMBODIMENTS

Figure 1:
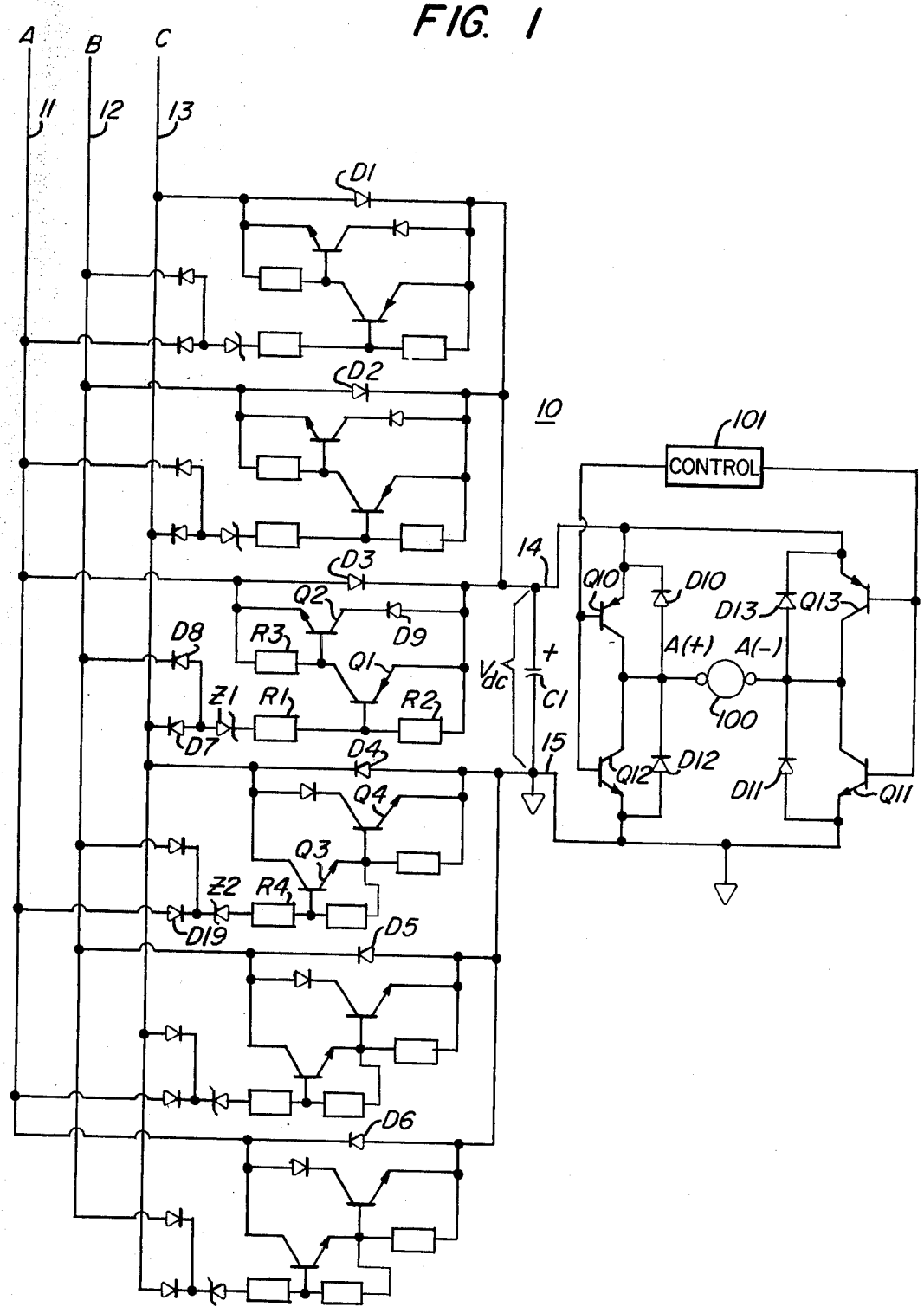
FIG. 1 is a circuit schematic of a regenerative DC power supply constructed according to the teachings of the present invention.

Referring now to the drawings and FIG. 1 in particular there is shown a circuit schematic of a regenerative DC power supply 10 constructed in accordance with the teaching of the present invention. Diodes D1 through D6 are connected in a full wave bridge configuration to provide full wave rectification of the three phase AC power lines 11, 12 and 13. The output of controller 10 is a DC voltage $V_{dc}$ across lines 14 and 15. Line 15 is connected to common. Capacitor C1 filters the DC voltage to dampen high frequency transient voltages. If power is being delivered to a load, rectifiers D1 through D6 will be conducting during some portion of the AC line cycle. Conduction and commutation of the rectification diodes D1 through D6 occurs naturally as a function of the three phase line potentials on lines 11, 12 and 13.

Figure 2:
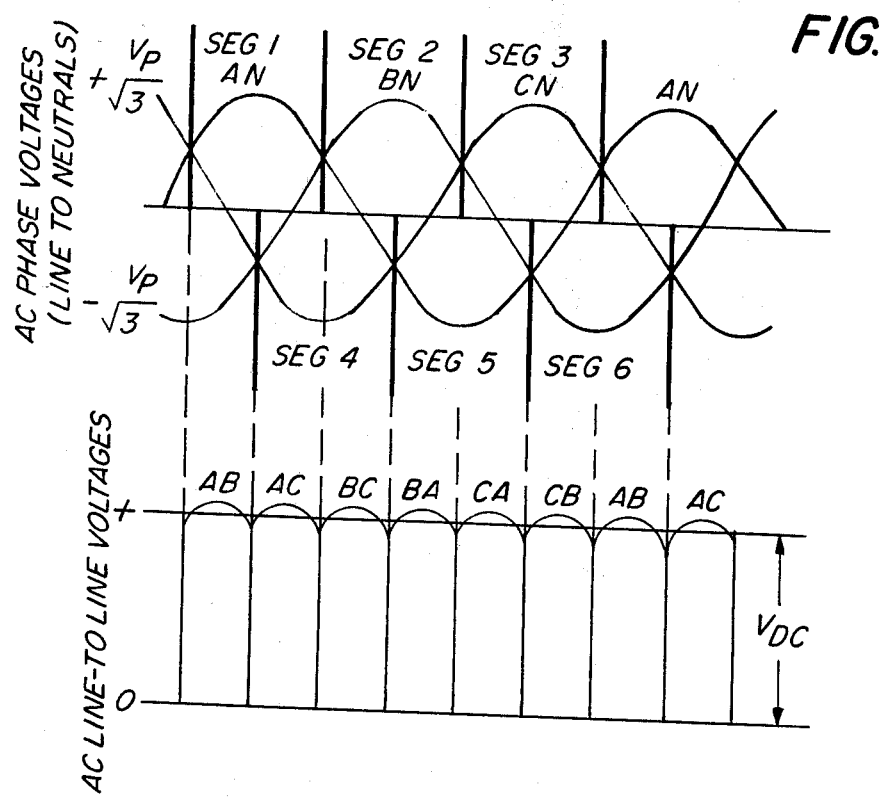
FIG. 2 is a graphic illustration of full wave rectified AC voltage illustrating the various time segments.

FIG. 2 shows the various conduction segments 1 through 6 associated with each of the three phase lines. Table I shows which rectifying diodes can be in conduction during the various segments.

TABLE I

| Time Segment | Conducting Diode |
| --- | --- |
| Seg. 1 | D3 |
| Seg. 2 | D2 |
| Seg. 3 | D1 |
| Seg. 4 | D4 |
| Seg. 5 | D6 |
| Seg. 6 | D5 |

If energy is being returned to the DC bus from the load, the voltage $V_{dc}$ will rise as capacitor C1 stores the additional energy.

The following analysis of circuit operation during the period of time, represented by segments 1 and 4, while the load is providing regenerative energy will show how circuit 10 operates. Regenerative operation for the various other time segments will be similar. As regenerative energy is supplied from the load this will result in the DC bus voltage $V_{dc}$ increasing above the voltage produced by normal AC line rectification. When this voltage increases by a sufficient amount diodes D3 and D4 which are potential conduction devices during segments 1 and 4 are reversed biased and therefore do not conduct. The bus voltage $V_{dc}$ will continue to increase as a function of the rate of energy generation and the charge storage capacity of capacitor C1. When the voltage potential between line 14 and incoming line 13 reaches the zener breakdown point of zener diode Z1 current will flow from line 14 through the base emitter junction of transistor Q1 through resistor R1, zener diode Z1 and diode D7 to line 13. This current flow between lines 13 and 14 will energize transistor Q1 which in turn will energize transistor Q2.

Current will be conducted by transistor Q2 from the DC bus line 14 to the AC line 11. Simultaneously similar processes occuring in the circuitry associated with transistor Q4 thereby creating a return path for current flow back to the DC bus common line 15. When the voltage potential between lines 11 and 15 reaches the zener breakdown point of zener diode Z2, current will flow from line 11 through diode D19, zener diode Z2 and resistor R4 and break over the base emitter junction of transistors Q3 and Q4 to line 15. This current flow will energize transistors Q3 and Q4. Current will be conducted by transistor Q4 from the AC line 13 to the DC power common line 15.

The current conduction which occurs through the transistors Q2 and Q4 during the intersection of time segments 1 and 4 will in effect apply the DC bus voltage $V_{dc}$ to the AC lines 11 and 13. This application of the DC bus voltage $V_{dc}$ to the DC line will then be transferred, by transformer action, back to the original power source or to other loads connected to the AC line. The operation of transistors Q2 and Q4 are determined by the magnitude of the DC bus voltage $V_{dc}$. When the DC bus voltage $V_{dc}$ is increased by regenerative energy, the various transistors will be made conductive until the DC bus voltage is reduced to an acceptable level. Normal circuit operation will involve these regeneration conduction transistors switching from saturation to cut off as the bus voltage, $V_{dc}$, requires.

Resistor, R2, is connected between the base and emitter of the driver transistor Q1. Resistor, R2, discharges the base-emitter junction after base current has stopped, thereby turning off driver transistor Q1. Resistor R2 is connected between the base and emitter of output transistor Q2. Resistor R3 functions to discharge the base emitter junction after base current has stopped thereby turning off transistor Q2. Resistor R1 is a dropping resistor which controls the amount of base current delivered to driver transistor Q1. Zener diode Z1 determines the voltage at which current is delivered to transistor Q1. During overvoltage conditions, when $V_{dc}$ exceeds a predetermined value, the three phase line 12 or 13 which is the most negative will force either diode D7 or D8 to forward biased and thereby initiate current conduction to transistor Q1. Driver transistor Q1 provides current gain needed to deliver base current to the output transistor Q2. Output transistor Q2 then conducts the regenerated current back to the AC line. Diode D9 is a blocking diode which prevents reverse current flow through transistor Q2 when rectifying diode D3 is forward biased, which is its normal state during conduction. Rectifying diode D3 supplies current to the DC bus as a function of relative AC line potentials and the DC bus potential.

The description of circuit 10 operation given for time segments 1 and 4 can be applied to the remaining time segments through the appropriate portion of circuit 10 associated with each time segment. The conduction devices shown are transistors, however, any similar device could be substituted with a corresponding change in the drive circuitry.

The load attached to the DC bus, lines 14 to 15, is a four quadrant power amplifier configured with an "H" type output bridge. This amplifier is capable of delivering current to or accepting current from its motor load (100). Additionally, the supplied current, by virtue of the output bridge configuration, can be delivered in either direction during normal circuit operation positive current (point A(+) positive with respect to point A(−)) will be delivered to motor load 100 by energizing transistors Q10 and Q11. When the required current is being conducted transistors Q10 and Q11 will be regulated by control means 101 to maintain this current. Similarly transistors Q12 and Q13 can be utilized to deliver negative current to the motor load 100. Under certain conditions the motor load 100 can function as a generator and produce a voltage which is greater than the DC bus voltage (14 to 15). If this occurs diode pairs D10, D11 or D12, D13 will apply this generated voltage to the DC bus by becoming forward biased. Regenerated energy will then flow from the motor load 100 through the diode pairs D10, D11 or D12, D13 to the DC bus (line 14 to line 15). This regenerated energy will then be returned to the AC lines by operation of circuit 10 as previously described. Diodes D10, D11, D12 and D13 also function as freewheeling diodes, conducting inductive energy back to the DC bus (line 14 to line 15).

Figure 4:
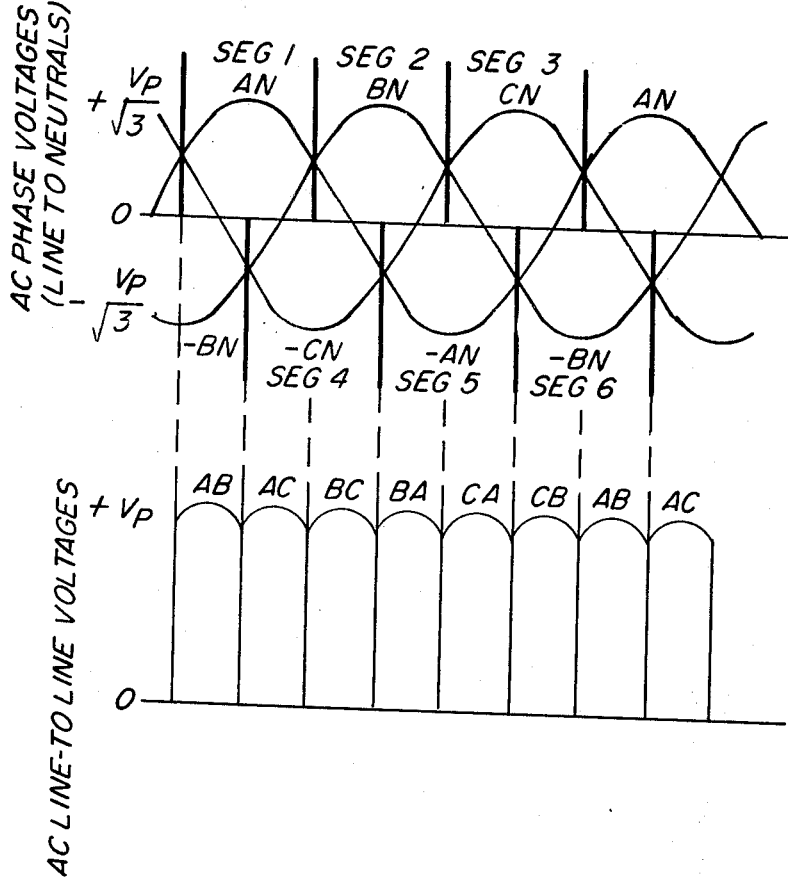
FIG. 4 is a graphic illustration of voltage waveforms associated with the power supply of FIG. 3.
Figure 3:
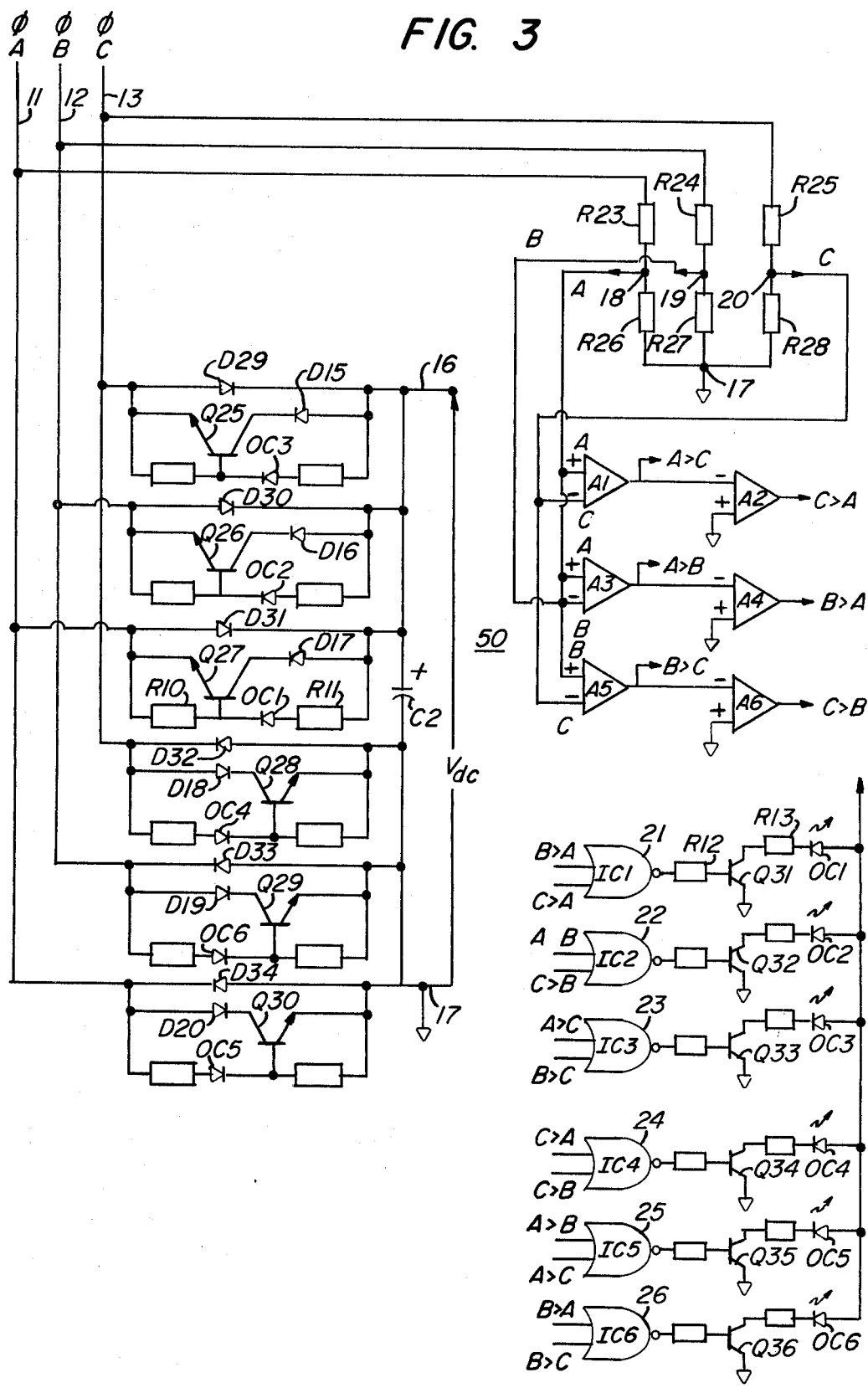
FIG. 3 is a circuit schematic of another regenerative power supply illustrating another embodiment of the present invention.

Referring now to FIG. 3 there is shown another circuit 50 for a regenerative DC power supply depicting another embodiment of the present invention. Diodes D29, D30, D31, D32, D33 and D34 provide full wave rectification of the three phase AC power lines 11, 12 and 13 to produce a DC bus voltage $V_{dc}$. The DC bus voltages, $V_{dc}$, is produced across a DC line 16 with respect to DC common line 17. Capacitor C2 filters the DC voltage to dampen any high frequency transient voltages present on the DC bus. If power is being delivered to the load, diodes D29 through D39 will be in conduction during portions of the AC line cycle. Conduction and commutation of the rectification diodes D29 through D34 occurs naturally as a function of the three-phase line potential. FIG. 4 shows the various conductance segments associated with each of the three phase lines 11, 12 and 13.

Table 2 shows which diodes D29 through D34 can be in conduction during the time segments Seg 1 through Seg 6.

TABLE II

| Time Segment | Conducting Diode |
| --- | --- |
| Seg. 1 | D31 |
| Seg. 2 | D30 |
| Seg. 3 | D29 |
| Seg. 4 | D32 |
| Seg. 5 | D34 |
| Seg. 6 | D33 |

If energy is being returned to the DC bus from the load transistors Q25, Q26, Q27, Q28, Q29 and Q30 are energized in the proper sequence to conduct this energy back into the three phase AC line.

Resistors R23, R24, R25, R26, R27 and R28 comprise a voltage divider circuit. At points 18, 19 and 20 are voltages A, B, C, respectively, which represent the relative polarities of the three-phase line phases. The amplitude of these voltages at points 18, 19 and 20 will vary depending on the voltage potential of the common point 17. However, their relative polarities will not vary. Referring to FIG. 4, the times during which any particular phase will be required to receive energy from the load are divided into individual segments. A total of six segments cover one complete cycle. Within any one segment the AC line which will be utilized to adsorb energy will be either higher or lower in potentials than both of the other two phases. For example phase A in segment 1 is at a higher potential than phase B and C. Likewise, point 18 will be at a higher potential than points 19 and 20. Table III contains a table of the relative phase potentials for each time segment.

TABLE III

| Time Segment | Relative Phase Potentials |
| --- | --- |
| Segment 1 | Phase A > Phase B |
| | Phase A > Phase C |
| Segment 2 | Phase B > Phase A |
| | Phase B > Phase C |
| Segment 3 | Phase C > Phase A |
| | Phase C > Phase B |
| Segment 4 | Phase C < Phase A |
| | Phase C < Phase B |
| Segment 5 | Phase A < Phase B |
| | Phase A < Phase C |
| Segment 6 | Phase B < Phase A |
| | Phase B < Phase C |

Operational amplifiers A1, A2, A3, A4, A5 and A6 along with nor gates IC1, IC2, IC3, IC4, IC5 and IC6 performs the logical comparison and combinations listed in Table III.

Points 21, 22, 23, 24, 25 and 26 indicate within which time segments the three phase AC lines are operating. Transistors Q31, Q32, Q33, Q34, Q35, and Q36 which are energized by NOR gates IC1, IC2, IC3, IC4, IC5 and IC6 in turn energize optical couplers OC1, OC2, OC3, OC4, OC5, and OC6, respectively. These optical couplers OC1 through OC6 energize the corresponding regeneration energy conducting transistors Q25 through Q30.

Resistor R10 is connected between the base and emitter of output transistor Q27 to discharge the base emitter junction after base current has stopped, thereby turning off transistor Q27. Resistor R11 is a dropping resistor which controls the amount of base current delivered to transistor Q27. Output transistor Q27 conducts the regenerated current back to the AC line. Blocking diode D17 prevents current flow when rectifying diode D31 is forward biased, which is its normal state during conduction. IC1 through IC6 are logic gates which will output a positive voltage under specific AC line conditions. Resistor R12 is a dropping resistor which allows the necessary base current to be delivered to transistor Q31. Transistor Q31 supplies needed current gain. Resistor R13 is a dropping resistor which allows the proper current to flow through optical coupler OC1. Optical coupler OC1 is composed of a light emitting diode, (LED) connectd to resistor R13 and a light detecting diode connected to resistor R11. When current flows through the LED section light is emitted. The detector diode section of OC1 is optically coupled to this LED section of OC1 and changes from a high impedance state to a low impedance state when the LED is activated. This low impedance in the detector diode of OC1 allows base current to flow to transistor Q27. Since the coupling means between the LED and the photodetector portions of OC1 is optical, electrical isolation is achieved.

If energy is being delivered to the load, the rectifying diodes D29 through D34 conduct current from the AC line to the DC bus. During this process diodes D15, D16, D17, D18, D19 and D20 which are reversed biased prevent current flow through transistors Q25, Q26, Q27, Q28, Q29 and Q30 respectively. If energy is being generated by the load, the regenerative energy conduction transistors Q25 through Q30 will in the proper sequence conduct current from the DC bus back to the AC line.

Although transistors were selected as switching conduction devices any other similar device with an associated appropriate change in drive circuitry could be utilized.

What is claimed is:

1. A regenerative DC power supply operable from an AC line comprising:
   an input connected to the AC line;
   an output connected to a DC bus;
   a plurality of rectifier devices connected between the input and the output to provide full wave rectification at the output;
   a transistor switching circuit connected in anti-parallel with each of said plurality of rectifiers; and,
   control means controlling each transistor switching circuit for conduction during an appropriate time period to conduct regenerative power from the DC bus to the AC line.

2. A power supply operable from multi-phase AC lines for connection to a regenerative load comprising:
   a full wave bridge rectifying circuit comprising a plurality of diodes connected between the AC lines and a +DC output line and a −DC output line;
   a plurality of unidirectional semiconductor switches each associated with and connected in anti-parallel around one of the diodes of said full wave bridge;
   a capacitor connected across the +DC output line and the −DC output line;
   sensing means for sensing which AC phase line is at the highest potential and which AC phase line is at the lowest potential;
   control means controlling said semiconductor switches in response to said sensing means for closing the semiconductor switches disposed around the diode connected between the +DC output line and the AC line at the highest potential and disposed around the diode connected between the −DC output line and the AC line at the lowest potential.

3. A power supply as claimed in claim 2 wherein said sensing means comprises:
   logic comparing means for sampling the relative potentials of the AC lines and performing a logical comparison to determine the AC lines having the highest potential and lowest potential.

4. A power supply as claimed in claim 3 wherein said control means comprises:
   optical coupler means disposed to provide electrical isolation between said plurality of unidirectional semiconductor switches and said sensing means.

5. A power supply as claimed in claim 2 wherein said sensing means comprises:
   a zener diode associated with each diode of said full wave bridge and having one end connected through selected resistance to one end of the associated diode and have the other end of the zener diode connected through appropriate diodes to the AC lines to which the associated diode is not connected.

6. A power supply having AC inputs and +DC and −DC outputs comprising:
   a plurality of rectifying diodes, one connected between each AC input and the +DC output and between each AC input and the −DC output;
   a plurality of transistor switches, one connected around each of said plurality of diodes; and,
   control means associated with said plurality of transistor switches for turning on the transistor switch connected to the AC input having the highest potential and the transistor switch connected to the AC input having the lowest potential.

7. A power supply as claimed in claim 6 comprising:
   a plurality of zener diodes one associated with each of said plurality of rectifying diodes and being connected through diode isolators between the +DC output or −DC output to which the associated rectifying diode is connected and the AC inputs other than the AC input to which the associated rectifying diode is connected; and
   said control means responsive to breakdown of said zener diodes to turn on the transistor switches connected around the rectifying diodes, associated with the zener diodes which break down.

8. A power supply as claimed in claim 6 wherein said control means comprises:
   a sampling resistor circuit for sampling the potential of the AC inputs;
   logic comparing means for comparing the sampled potentials of the AC inputs to determine the AC input having the highest potential and the AC input having the lowest potential;
   optical coupling means connected between said logic comparing means for turning on the proper transistor switches while providing electrical isolation between said plurality of transistor switches and said logic comparing means.

* * * * *

UNITED STATES PATENT AND TRADEMARK OFFICE
CERTIFICATE OF CORRECTION

PATENT NO. : 4,272,807
DATED : June 9, 1981
INVENTOR(S) : Gerard A. Gallagher

It is certified that error appears in the above–identified patent and that said Letters Patent are hereby corrected as shown below:

Col. 3, line 9, delete "R2" and substitute therefor --R3--.

Signed and Sealed this

Twenty-fifth Day of August 1981

[SEAL]

Attest:

Attesting Officer

GERALD J. MOSSINGHOFF

Commissioner of Patents and Trademarks